United States Patent [19]

Purpora

[11] Patent Number: 4,821,559
[45] Date of Patent: Apr. 18, 1989

[54] LINE TEST ISOLATION PLUG

[76] Inventor: William J. Purpora, 5541 North Kent Ave., Whitefish Bay, Wis. 53217

[21] Appl. No.: 112,470

[22] Filed: Oct. 26, 1987

[51] Int. Cl.$^4$ ............................................. G01M 3/28
[52] U.S. Cl. ..................................... 73/40.5 R; 138/90
[58] Field of Search ........................... 73/40.5 R, 49.8; 138/90

[56] References Cited

U.S. PATENT DOCUMENTS

| | | | |
|---|---|---|---|
| 2,564,402 | 8/1951 | MacArthur | 138/90 X |
| 2,952,387 | 9/1960 | Fowler et al. | 73/40.5 R X |
| 2,952,388 | 9/1960 | Deters | 73/40.5 R X |
| 2,979,939 | 4/1961 | Shuh | 73/40 |
| 3,183,723 | 5/1965 | Deters | 73/40.5 R |
| 3,261,201 | 7/1966 | Pottash | 73/40.5 R |
| 3,273,753 | 9/1966 | Johnson et al. | 73/40.5 R X |
| 3,439,837 | 4/1969 | Hearn et al. | 73/40.5 R X |
| 3,454,195 | 7/1969 | Deters | 73/40.5 R X |
| 3,910,102 | 10/1975 | McLean | 73/40.5 R |
| 3,940,020 | 2/1976 | McCrory et al. | 73/40.5 R X |
| 4,679,587 | 7/1987 | Jarr | 73/40.5 R X |

FOREIGN PATENT DOCUMENTS 58-24830  2/1983  Japan ............................. 73/40.5 R

*Primary Examiner*—Stewart J. Levy
*Assistant Examiner*—Joseph W. Roskos
*Attorney, Agent, or Firm*—Andrus, Sceales, Starke & Sawall

[57] ABSTRACT

An isolation plug suitable for leakage testing a liquid conduit has an O-ring seal mounted adjacent one end of its body to mate with a sleeve in a pump fitting for the conduit when the plug is inserted in the fitting through a threaded hole. This seals off the outlet of the fitting from its remaining portions. The plug contains a bore through which the liquid in the conduit may be pressurized for testing purposes. An additional base in the isolation plug communicates with the portions of the fitting upstream of the seal to permit liquid to be discharged from the tank through the additional bore.

12 Claims, 2 Drawing Sheets

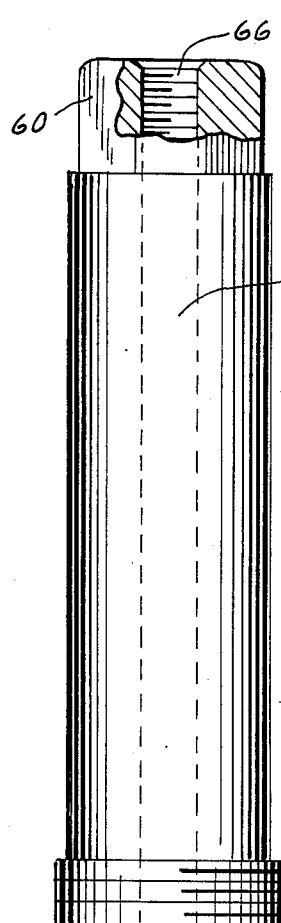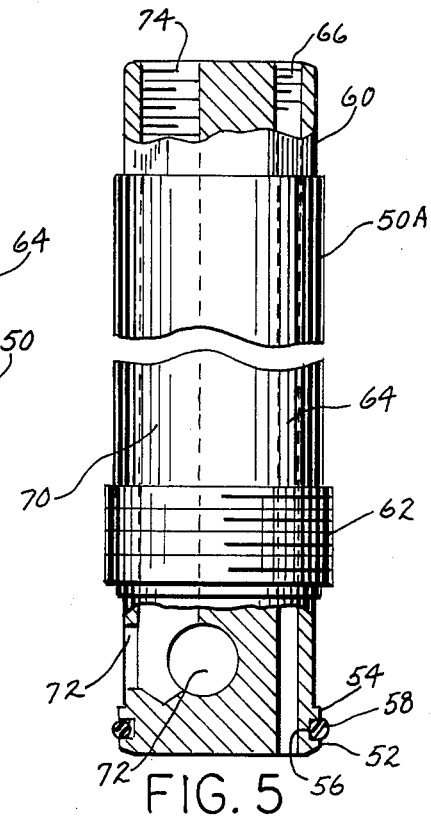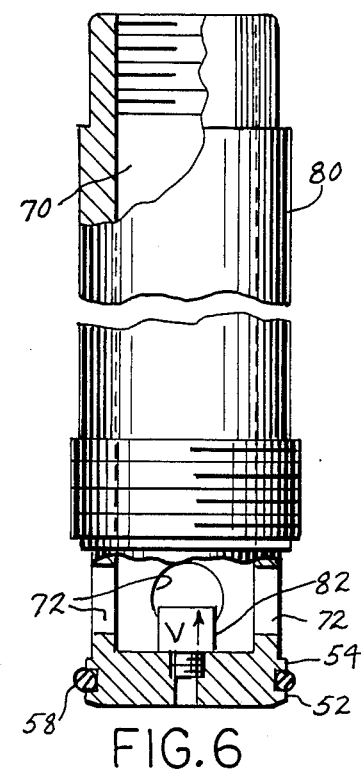
FIG. 3  FIG. 5  FIG. 6
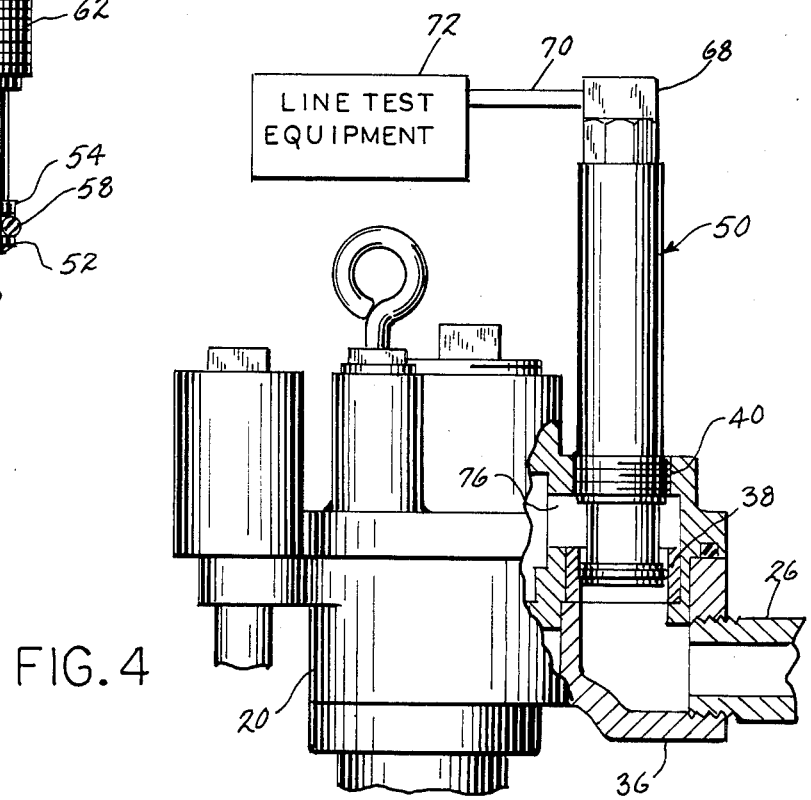
FIG. 4

LINE TEST ISOLATION PLUG

The present invention relates to a plug for isolating a liquid product delivery line and a liquid supply so that the former may be tested for leaks by a line tester and the latter accessed separately of the line. The invention may be used to check underground fuel delivery lines extending from an underground bulk storage tank to dispensing apparatus or to remove liquid from the underground storage tank.

A typical filling station has an underground bulk storage tank. A pump in the tank withdraws liquid, such as fuel from the bulk storage tank and supplies same to underground product delivery lines extending to the dispensers that provide the fuel to the consumer.

It is periodically necessary to check the underground product delivery lines to insure that no leaks exist in the lines. Such leaks result in a loss of the liquid, contamination or loss of structural properties in the surrounding soil and/or contamination of the product being dispensed from the dispenser. When the liquid is a highly volatile one, such as gasoline, such leaks can be dangerous.

To this end, leak detectors have been developed for the liquid product delivery lines. One such leak detector is mounted in the pump fitting at the top of the tank. It has a pressure responsive mechanism that senses the loss in pressure associated with a leak and provides a signal, such as a reduced liquid flow rate, to the operator of the filling station.

In another technique, a pressurizing apparatus is connected to a suitable connection in the dispenser for pressurizing the line. The loss of liquid or pressure in the line serves to indicate a leak. However, to a great extent the veracity of this test depends on the integrity of the check valve in the pump end of the line. If the check valve leaks, it is difficult to determine whether the leak is in the line or the check valve.

In testing the underground bulk storage tank for leaks, it is necessary to completely fill the tank so that volumetric losses can be determined. This usually requires the transfer of liquid from one underground storage tank to another. However, an additional, portable pump is required for transfer purposes since the pumps in the tanks are connected only to the product delivery lines. The need for an additional pump increases the cost, time, and hazards associated with detecting leaks in the tank.

Briefly, the present invention is directed to an isolation plug suitable, in one embodiment, for leakage testing a liquid conduit, such as an underground product dispensing line, in an accurate, economical and time saving manner. The liquid conduit is connected to the outlet of a pump fitting having a sleeve through which the liquid discharged by the pump passes and a threaded hole aligned with the sleeve. The sleeve and hole customarily receive a pressure responsive leak detector of the type described above.

The isolation plug of the present invention replaces the pressure responsive leak detector when the line is to be tested. The isolation plug may comprise a generally cylindrical body. Sealing means, such as an O-ring, is mounted adjacent one end of the body. The sealing means mates with the sleeve of the fitting when the plug is inserted in the fitting through the threaded hole to seal off the outlet of the fitting from its remaining portions. Threads on the exterior of the cylindrical body mate with those of the threaded hole when the plug is inserted in the fitting to retain the plug in the fitting. A bore extends generally axially through the body. One end of the bore opens into the outlet of the fitting downstream of the seal formed between the sealing means and the sleeve. The other end of the bore has means adapted to mate with line test apparatus to permit the fluid in the liquid conduit to be pressurized for testing purposes.

Other embodiments of the invention permit access to the tank, as well as the product delivery line. This permits liquid to be withdrawn from the tank, including withdrawal while the product delivery line is being tested. Should it be determined that the delivery line is leaking, the liquid may be transferred to a tank in which the product delivery line is not leaking. Or, the withdrawn liquid may be used to top off other tanks in order to test the tanks for leaks.

The invention will be further understood from the following detailed description taken in conjunction with the drawing in which.

FIG. 3. is a side view showing the isolation plug of the present invention;

FIG. 4 is a cut away side view showing the isolation plug of the present invention in use;

FIG. 5 is a partially cut away side view of a modification of the isolation plug; and FIG. 6 is a partially cut away side view of another isolation plug.

Figure 1:
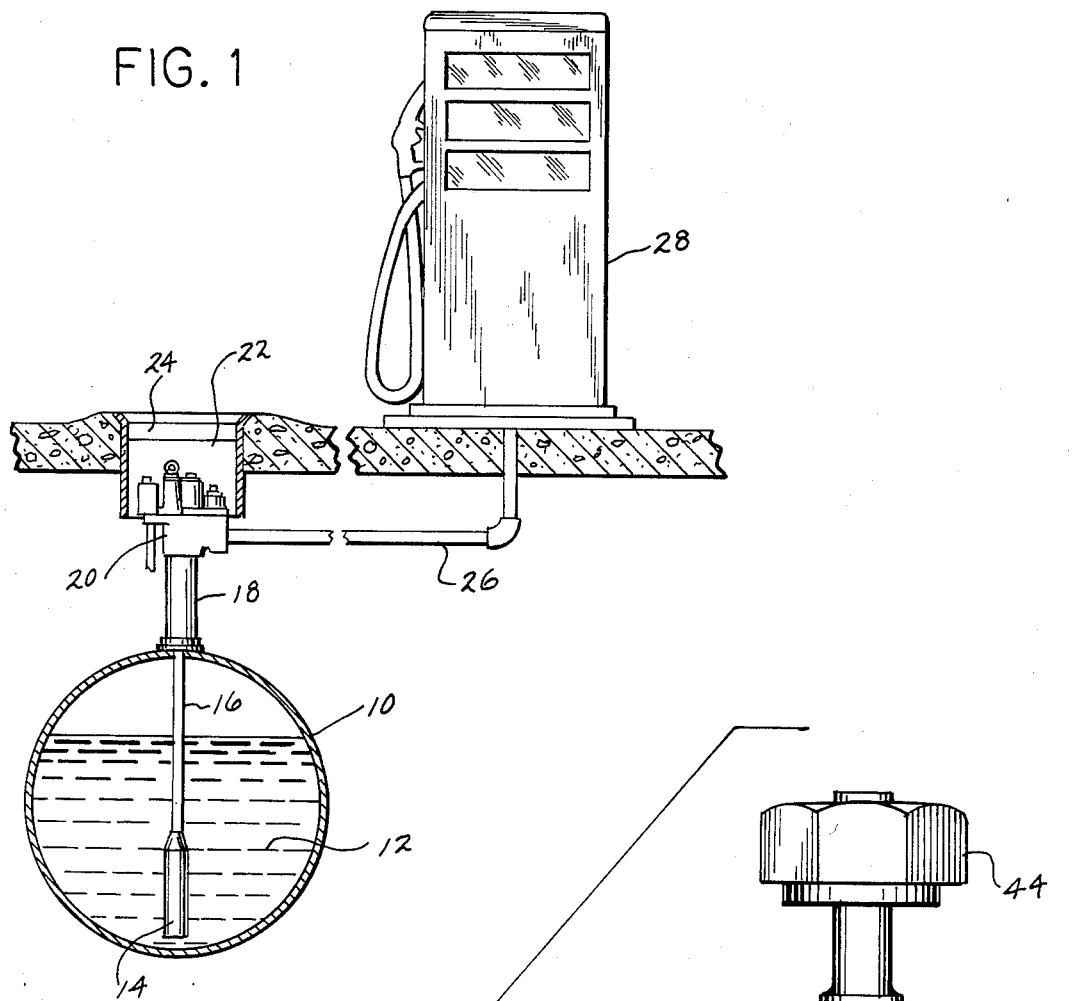
FIG. 1 is a somewhat diagrammatic view of underground liquid storage and dispensing apparatus.

In FIG. 1, the numeral 10 indicates a storage tank for liquid 12, such as fuel. Tank 10 is mounted underground. Motor driven pump 14 is mounted in tank 10 by pipe 16 to discharge fuel from tank 10 through riser 18. Pump 14 may be of the two stage centrifugal impeller type. Fitting 20, containing the electrical connection for pump 14 and a check valve, can be accessed by manhole 22 and removable cover 24 in the surface of the ground or covering pavement. Fitting 20 is connected to one end of product delivery line 26 which is also buried in the ground. The other end of product delivery line 26 is connected to dispenser 28, such as a convention fuel dispenser.

Figure 2:
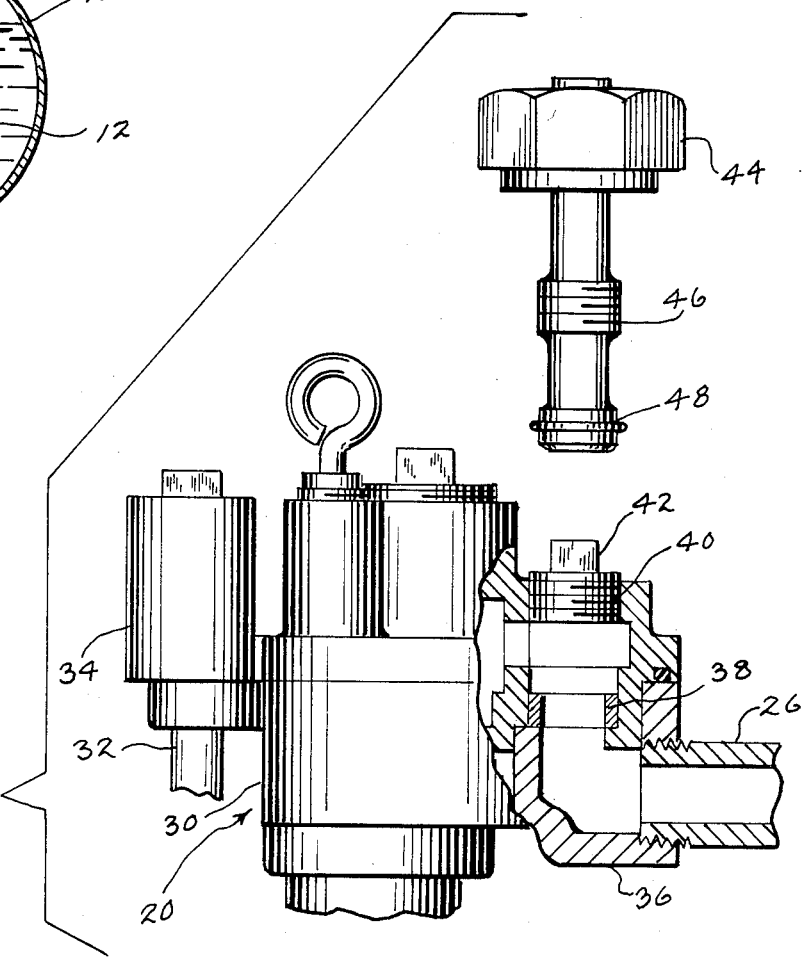
FIG. 2 is a cut away side view showing the details of a pump fitting and prior art line leakage indicator employed in the apparatus of FIG. 1.

FIG. 2 further shows fitting 20. Fitting 20 has housing 30 containing a starting capacitor for the motor of pump 14 and a check valve for product delivery line 26. Pump 14 is energized from power lines in conduit 32 connected to connector 34 of fitting 20.

Product delivery line 26 is connected to outlet member 36 of fitting 20. Outlet member 36 contains sleeve 38 and threaded hole 40. Threaded plug 42 may be placed in threaded hole 40. Threaded hole 40 and sleeve 38 permit the optional use of leak detector 44 in conjunction with fitting 20. To use leak detector 44, plug 42 is removed from hole 40 and leak detector 44 inserted in hole 40. Leak detector 44 has a threaded portion 46 for mating with threaded hole 40. It has a sealing portion 48 that mates with sleeve 38 in outlet member 36. Leak detector 44 typically utilizes the loss of pressure in product delivery line 26 to detect leaks in the product delivery line. Upon the detection of a leak, detector 44 acts to prevent full flow of liquid 12 through product delivery line 26. This acts as a signal to the operator that a leak exists in product delivery line 26. Leak detector 44 is described in one or more of the following U.S. Pat. Nos. 3,183,723 and 3,454,195 and is currently sold by Red Jacket Pumps of Mission, Kansas.

FIG. 3 shows isolation plug 50 constructed in accordance with the present invention that may be used in lieu of leak detector 44 to determine the integrity of product delivery line 24. Isolation plug 50 may be generally cylindrical in nature. One end of isolation plug 50 has ridges 52 and 54 and groove 56 to contain O-ring seal 58. The other end of isolation plug 50 has an hexagonal cross sectional configuration formed by flat surfaces 60. Isolation plug 50 contains raised threaded portion 62 intermediate its ends. Passage 64 extends through isolation plug 50. The end of passage 64 at the hexagonal end of isolation plug 50 contains internal threads 66.

In use, a manhole cover 24 is removed from manhole 22 to gain access to fitting 20. Plug 42 is removed from pump 14 and isolation plug 50 inserted in its stead, as shown in FIG. 4. A wrench may be applied to flat surfaces 60 to rotate the isolation plug. The threads of raised portion 62 engage the threads of hole 40 to secure plug 50 in outlet member 36 of fitting 20. O-ring seal 58 seals to sleeve 38. This isolates the outlet member 36 of fitting 20 from the other portions of the fitting. Connector 68 of line 70 of tester 72 is threaded into threads 66 of passage 64. Line tester 72 contains a means for pressurizing product delivery line 26 and sensing any loss in that pressure. Product delivery line 26 can thus be tested for leaks in a simple, economical manner from fitting 20 instead of from a test port of dispenser 28.

A modification of isolation plug 50 is shown in FIG. 5 as plug 50A. The components of isolation plug 50A corresponding to those of plug 50 shown in FIG. 3, are identified by similar reference numerals. In addition to passage 64, isolation plug 50A contains passage 70. The lower end of passage 70 is connected to a plurality of openings 72 extending through the exterior of isolation plug 50A between seal 58 and threaded portion 62. The upper end of passage 70 contains threads 74.

When installed in fitting 20 in a manner corresponding to that shown in FIG. 4, openings 72 communicate with the discharge from pump 14 in passage 76 of fitting 20. This permits pump 14 to be operated to discharge liquid 12 through passage 70 to a hose connected to threads 74. Liquid 12 may thus be removed from tank 12 while product delivery line 26 is being pressure tested. For example, such liquid may be used to top off other tanks in order to test the tanks for leaks during a periodic testing of both the tanks and the product delivery lines at a filling station. It avoids the need for separate, additional transfer pumps and associated electrical cords for this purpose.

Plug 80 shown in FIG. 6 contains only passage 70 for liquid transfer purposes. Pressure relief valve 82 provides expansion relief for fluid in product delivery line 26, while isolating the line during pump over from tank 10.

Various modes of carrying out the invention are contemplated as being within the scope of the following claims particularly pointing out and distinctly claiming the subject matter which is regarded as the invention.

I claim:

1. An isolation plug suitable for leakage testing of a liquid conduit by means of line test apparatus capable of pressurizing the liquid conduit, said liquid conduit being connected to the outlet of a fitting having a sleeve through which the liquid discharged from the fitting passes, said fitting having a threaded hole axially aligned with the sleeve, said isolation plug comprising:

an elongated body having an exterior surface surrounding and defining the body in a direction parallel to its elongation, said surface extending between ends of said body;

sealing means on said exterior surface adjacent one end of said body, said sealing means surrounding said body and being adapted to mate with the sleeve in the fitting when said plug is inserted in the fitting through the threaded hole to seal off the outlet of the fitting from the remaining portions of the fitting; and thread means on said exterior surface of said body intermediate the ends of said body, said thread means mating with the threaded hole in the fitting when the plug is inserted in the fitting for retaining the plug in the fitting;

said body having a passage extending therethrough, one end of said passage opening into the outlet of the fitting downstream of the seal formed between said sealing means and the sleeve, the other end of said passage opening on said body exteriorly of the fitting, the other end of said passage having means adapted to mate with the line test apparatus to permit pressurizing of the liquid conduit for testing purposes.

2. The isolation plug according to claim 1 wherein said exterior surface is cylindrical.

3. The isolation plug according to claim 2 wherein said sealing means comprises O-ring sealing means.

4. The isolation plug according to claim 1 wherein said means at the other end of said passage adapted to mate with the line test apparatus comprises threads.

5. The isolation plug according to claim 1 wherein said passage extends through said body from one end of said body to the other end of said body.

6. The isolation plug according to claim 1 wherein said body contains an additional passage, one end of said additional passage opening into the fitting upstream of the seal formed between said sealing means and the sleeve, the other end of said additional passage opening on said body exteriorly of the fitting, said additional passage permitting transport of liquid out of the fitting.

7. The isolation plug according to claim 6 wherein the other end of said additional passage opens at an exposed end of said body.

8. The isolation plug according to claim 6 wherein the other end of said additional passage contains threads.

9. An isolation plug suitable for transporting liquid out of a fitting for a liquid conduit, said liquid conduit being connected to the outlet of the fitting, said fitting having a sleeve through which liquid discharged from the fitting passes and a threaded hole axially aligned with the sleeve, said isolation plug comprising:

an elongated body having an exterior surface surrounding and defining the body in a direction parallel to its elongation, said surface extending between ends of said body;

sealing means on said exterior surface adjacent one end of said body, said sealing means surrounding said body and being adapted to mate with the sleeve in the fitting when said plug is inserted in the fitting through the threaded hole to seal off the outlet of the fitting from the remaining portions of the fitting; and thread means on said exterior surface of said body intermediate the ends of said body, said thread means mating with the threaded hole in the fitting when the plug is inserted in the fitting for retaining the plug in the fitting;

said body having a passage therein, one end of said passage opening into said fitting upstream of the seal formed between said sealing means and the sleeve, the other end of said passage opening on said body exteriorly of said fitting, said passage permitting transport of liquid out of said fitting.

10. The isolation plug according to claim 9 including pressure relief means in said passage for relieving pressure in the liquid conduit.

11. The isolation plug according to claim 9 wherein said passage opens at an exposed end of the body.

12. The isolation plug according to claim 9 wherein said passage includes threads in the other end thereof.

* * * * *